United States Patent
Chan (10) Patent No.: US 9,261,702 B2
(45) Date of Patent: Feb. 16, 2016

(54) OPTICAL DEVICE FOR BEAM SHAPING

(71) Applicant: HIGHYAG Lasertechnologie, Kleinmachnow (DE)

(72) Inventor: Danny Chan, Kleinmachnow (DE)

(73) Assignee: HIGHYAG Lasertechnologie GmbH, Kleinmachnow (DE)

( * ) Notice: Subject to any disclaimer, the term of this patent is extended or adjusted under 35 U.S.C. 154(b) by 17 days.

(21) Appl. No.: 14/192,962

(22) Filed: Feb. 28, 2014

(65) Prior Publication Data

US 2014/0268368 A1  Sep. 18, 2014

(30) Foreign Application Priority Data

Mar. 12, 2013  (DE) .......................... 10 2013 102 442

(51) Int. Cl.
| | |
|---|---|
| G02B 27/09 | (2006.01) |
| G02B 3/02 | (2006.01) |
| B23K 26/073 | (2006.01) |
| B23K 1/005 | (2006.01) |
| B23K 26/06 | (2014.01) |
| B23K 26/20 | (2014.01) |
| B23K 26/38 | (2014.01) |
| G02B 3/00 | (2006.01) |

(52) U.S. Cl.
CPC ............. *G02B 27/095* (2013.01); *B23K 1/0056* (2013.01); *B23K 26/0652* (2013.01); *B23K 26/073* (2013.01); *B23K 26/0734* (2013.01); *B23K 26/20* (2013.01); *B23K 26/38* (2013.01); *B23K 26/381* (2013.01); *G02B 27/09* (2013.01); *G02B 27/0927* (2013.01); *G02B 27/0955* (2013.01); *G02B 2003/0093* (2013.01)

(58) Field of Classification Search
CPC .... G02B 3/00; G02B 2003/0093; G02B 3/06; G02B 27/09; G02B 27/095; G02B 27/0955; G02B 27/0966
USPC ......... 329/642, 708–712, 717–719, 741, 754, 329/793
See application file for complete search history.

(56) References Cited

U.S. PATENT DOCUMENTS

| | | | |
|---|---|---|---|
| 3,305,294 A | 2/1967 | Alvarez | |
| 3,583,790 A * | 6/1971 | Baker | ........................... 359/676 |
| 4,275,288 A | 6/1981 | Makosch et al. | |
| 2012/0154922 A1* | 6/2012 | Briand et al. | ................. 359/641 |

FOREIGN PATENT DOCUMENTS

| | | |
|---|---|---|
| DE | 2821883 | 10/1979 |
| DE | 19961918 | 7/2001 |
| DE | 10044522 | 4/2002 |
| DE | 10254847 | 2/2004 |
| DE | 102010016628 | 9/2011 |
| JP | 2002033272 A | 1/2002 |
| JP | 2009529709 A | 8/2009 |

* cited by examiner

*Primary Examiner* — Darryl J Collins (74) *Attorney, Agent, or Firm* — 24IP Law Group; Timothy R DeWitt (57) ABSTRACT

The invention concerns an optical device and its application to generate an adjustable wave front deformation of a laser beam and thus to generate an adjustable beam spot geometry in the focal plane of laser optics. For this purpose, a device is provided which allows adjusting and modifying a laser beam in such a way that a beam spot, the shape of which can be adjusted continuously based on the original focal shape, is generated after focusing the beam, i.e. at least one dimension parameter of the shape of the beam spot has to be variable and adjustable so that the beam parameter product of the beam can also be modified without having to modify the focal position.

17 Claims, 7 Drawing Sheets

Figure 1 (State of the art)

OPTICAL DEVICE FOR BEAM SHAPING

BACKGROUND OF THE INVENTION

1. Field of the Invention

The invention concerns an optical device and its application to generate an adjustable wave front deformation of a laser beam. Using such a device aims at modifications of beam spot geometry in the focal range of the laser beam and with it modifications of the beam parameter product of the laser beam.

2. Brief Description of the Related Art

Using laser beaming, for example for material processing, it is often desirable to have the option to use a special beam spot geometry to optimize the work results. A laser beam focus or a beam spot with ring-shaped intensity distribution is required for many applications.

The use of a so-called axicon, for example, is mentioned in the State of the art, that i.e. a lens with a cone-shaped effective surface which is inserted into the optical path of laser processing optics. This type of devices is described in documents DE 28 21 883, DE 100 44 522, DE 102 54 847 or DE 10 2010 016 628.

The devices described in the documents mentioned above aim at a ring-shaped beam distribution on at least one plane. The mentioned devices cannot be used to adjust the beam parameter product continuously, for example by adjusting the diameter of the ring. Modifications of the diameter of the ring require replacing the axicon with another one with a different cone angle of the cone surface.

It is mentioned in the State of the art that it is necessary to place two optical elements with respectively specially shaped surfaces in the optical path to generate variable, i.e. adjustable wave front deformations. The optical elements are positioned transverse to the beam direction and they are displaceable against each other. It is possible to generate different types of wave front deformation depending on the type of optical elements. The lateral displacement of elements with spherical surfaces of which the refractive powers compensate each other allows inclining a plane wave front by an adjustable angle. Thus, the device acts as an optical wedge with an adjustable wedge angle. Such a device is called "Abat's wedge" in the field of technical optics. A similar device of this type, however using elements with cylindrical surfaces, is mentioned in DE 199 61 918.

A similar device, which is described in U.S. Pat. No. 3,305,294, is used to generate a parabolic wave front deformation with an adjustable curvature, which corresponds to a lens with adjustable refractive power or with an adjustable focal length regarding its effect. In this case, the elements have to consist of surface shapes of which the local thickness of the elements is mainly defined by cubic terms, i.e. power functions of third degree with the lateral coordinates x and y in order to have the requested optical effect. This type of device has meanwhile been called "Alvarez lens" because it was invented by Alvarez. This lens with variable refractive power is used, for example, to adjust continuously the focal position of a lens. However, it is not possible to modify the beam parameter product.

None of the mentioned devices is able to generate a wave front deformation by means of which the beam parameter product of the laser beam can continuously be adjusted and magnified beginning with its original value.

SUMMARY OF THE INVENTION

The invention is based on the problem to adjust and modify a laser beam in such a way that a beam spot is generated after focussing the beam of which the shape can continuously be adjusted based on the original focal shape, i.e. at least one parameter of the shape of the beam spot has to be variable and adjustable. The aim is not only to modify the focal position. This would modify the diameter of the beam in the original focal plane, but the beam parameter product would not be modified. Thus, a particular problem of the invention is to provide a parameter of the beam spot in the focal plane which is variable without having to modify the focal position. Thus, the beam parameter product can also be modified, which is requested.

Wherein the invention described in the following the term "plate-like optical element" is defined as an optical element with front and back and a thickness which is many times lower than the lateral dimensions and of which the front and back are optical effective surfaces which are generally not plane, but which can be free-form surfaces with curvatures or random structures so that the thickness of the element provides local variations and is thus position dependent. One of both optical effective surfaces of the plate-like element can also be an optical flat. Such a plate-like optical element can simply be defined as "plate"; notably, two plate-like optical elements positioned in a row are simply defined as "plate pair" wherein the described invention.

A device consisting of at least two plate-like optical elements, which have a position dependent thickness and which are positioned in a row at short distance in the optical path of a position limited ray beam, is provided to solve the problem. The two plate-like elements are positioned along an axis transverse to the diffusion direction of the ray beam, and they are displaceable. A position of the plate-like elements called neutral position is defined at the position where the thickness profiles of both elements are inverse to each other. The total sum of the thickness profiles of both optical elements describes a profile, which corresponds to an isosceles triangle, considering a centre, cross section along the displacement axis. It is possible to adjust the inclination of the laterals of the triangular profile considering a centre cross section of the sum of both optical elements by displacing the two optical elements against each other.

Furthermore, the two plate-like elements provide each a thickness profile that shows a constant curvature considering a centre cross section along the displacement axis, which is constantly positive in one half of the centre cross section and constantly negative in the other half, and the absolute value of the curvature is the same on both sides.

An embodiment of the invention is provided wherein the sum of the position dependent thicknesses of both optical elements together describes a cone surface. The cone angle of the cone surface can be adjusted by displacing the two optical elements against each other. In this embodiment the position dependent thickness $D_{xy}$ of a single plate-like element is defined for the two elements by the following equation:

$$D_{xy}=D_0+(a/2)\{x(x^2+y^2)^{1/2}+y^2[\ln(x+(x^2+y^2)^{1/2})-\ln|y|]\}+bx$$

x is the coordinate in the direction of the displacement axis, y is the coordinate vertically to the displacement axis, $D_0$ is the thickness of the element on the optical axis if x=y=0, and a and b are two constant parameters.

Furthermore, an embodiment of the device is provided wherein the sum of the position dependent thicknesses of both optical elements together describes a pitched roof surface with an isosceles triangular cross section. The inclination angle of the lateral surfaces of the roof surface can be adjusted by displacing the two optical elements against each other. In this illustrative embodiment of the invention the position dependent thickness $D_{xy}$ of a single plate-like element is defined for the two elements by the following equation:

$$D_{xy}=D_0+(a/2)x|x|+bx$$

x is the coordinate in the direction of the displacement axis, $D_0$ is the thickness of the element on the optical axis if x=y=0, and a and b are two constant parameters.

The two plate-like elements may be configured in such a way that the thickness profile of both plate-like elements is identical, wherein one element is positioned rotated by 180° along the y-axis with respect to the other element, wherein the y-axis is the axis which is positioned both vertically to the displacement axis of the elements and vertically to the optical axis.

Furthermore, the two plate-like elements may be configured in such a way that the thickness profile of both plate-like elements is identical, wherein one element is rotated by 180° along the z-axis with respect to the other element, wherein the z-axis corresponds to the optical axis.

A focusing lens can be arranged behind the two plate-like elements.

A collimation lens can be arranged in front of both plate-like elements.

It is provided that the maximum movement of both plate-like elements against each other corresponds to maximal 10% of the lateral dimensions of the plates.

It is provided that the maximum movement of both plate-like elements against each other corresponds to maximal 20% of the diameter of the laser beam.

The variation of the thickness of the plate-like elements can be kept to a minimum by choosing an appropriate dimension for parameter b of the linear term in the equations for the thickness profile of the elements and not zero.

It is provided that the plate-like elements are made of zinc sulphide.

The device can be used to modify at least one dimension parameter of the beam spot in the focal plane without having to modify the focal position.

It is provided that the device is used to generate a wave front deformation of which the beam parameter product of the laser beam is continuously adjusted and magnified beginning with its original value.

It is provided to use the invention in a device designed to assemble or cut components.

BRIEF DESCRIPTION OF THE FIGURES

The invention is described in detail in the following figures, but it is not limited to the shown embodiments. It represents:

FIG. 5A-E: Schematic representation of the beam spot in the focal plane of optics for a possible embodiment of the invention wherein a ring-shaped beam spot with an adjustable diameter of the ring is generated. Additionally, the respective corresponding intensity profile for possible settings for displacing the plate pair is presented. In FIG. 5a the plate pair is in zero position so that no ring is generated; in FIGS. 5b to 5e the displacement is gradually increased so that the diameter of the ring of the beam spot increases.

FIG. 6A-E: Schematic representation of the beam spot in the focal plane of optics for another possible embodiment of the invention wherein a double focus with an adjustable distance of the different foci is generated. Additionally, the respective corresponding intensity profile for possible settings for displacing the plate pair is presented. In FIG. 6a the plate pair is in zero position so that no double focus is generated; in FIGS. 6b to 6e the displacement is gradually increased so that the distance of the different foci increases.

DETAILED DESCRIPTION OF THE INVENTION

Figure 1:
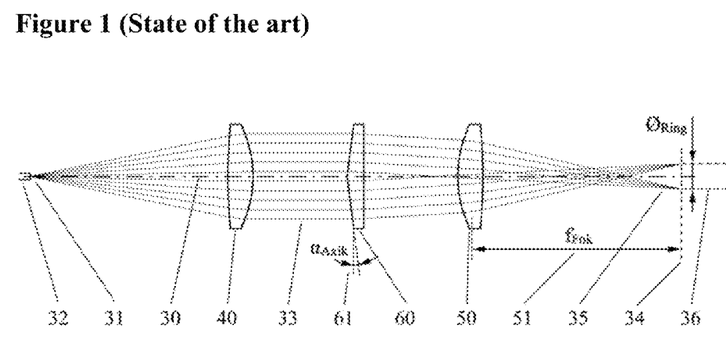
FIG. 1: Schematic representation of a device according to the state of the art to generate a ring-shaped beam spot in the focal plane of optics using a cone lens (axicon).

FIG. 1 shows how a ring-shaped beam focus 35 is generated in the focal plane 34 of laser optics by means of a cone lens or an axicon 60 in laser optics. Typically, laser optics consist of a collimator 40 and a focusing lens 50, which are conjointly positioned on an optical axis 30. A collimator 40 collimates the beam emitted by a beam source 31; a fibre tip 32 can generate the beam source 31, for example. The focusing lens 50 with the focal length 51 images the collimated beam 33 in the focal plane 34. In this context, the axicon 60 can be positioned between the collimator 40 and the focussing lens 50 of laser optics. Such a device is sufficiently mentioned in the state of the art. The cone angle 61 of the axicon has to be modified to adjust the diameter of the ring 36 of the ring-shaped beam spot 35. Modifications are only possible if the axicon 60 is replaced.

Figure 2A:
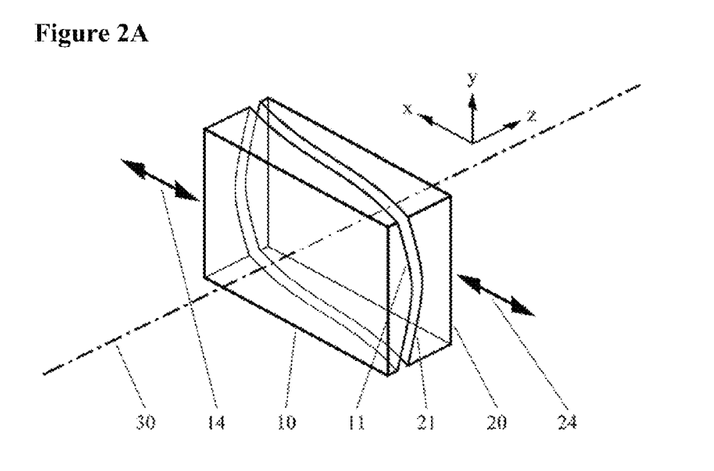
FIG. 2A: Schematic representation of a device according to the invention with two plate-like optical elements, which are arranged displaceable against each other.

FIG. 2A shows a schematic representation of the invention. It consists of a first plate-like element 10 and a second plate-like element 20 which are positioned in a row at short distance on an optical axis 30 and represent a plate pair in combination. Each plate-like element provides at least one optical free-form surface 11, 21. The two plates are positioned along the axes 14 and 24, and they are displaceable against each other.

Figure 2B:
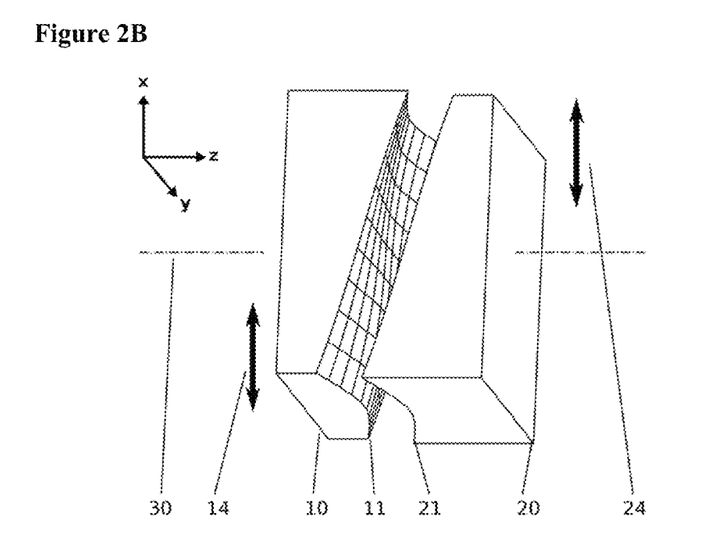
FIG. 2B: Schematic representation of a device according to the invention in a different perspective. A grid in a possible embodiment of the invention indicates the typical surface shape of the plate-like element.

FIG. 2B shows the same elements of the device according to the invention as FIG. 2A in a different perspective. Additionally, the free-form surface 11 of the plate-like element 10 is indicated by a grid to illustrate the typical surface shape of a possible embodiment of the invention.

Figure 3A:
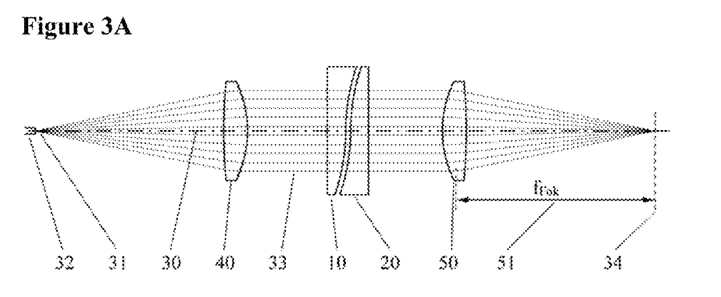
FIG. 3A: Representation of a schematic array of a device according to the invention in laser optics to generate a ring-shaped beam spot in the focal plane of laser optics with a plate pair in a zero position so that the plate pair does not have any optical effect and is able to generate an unmodified beam spot.
Figure 3B:
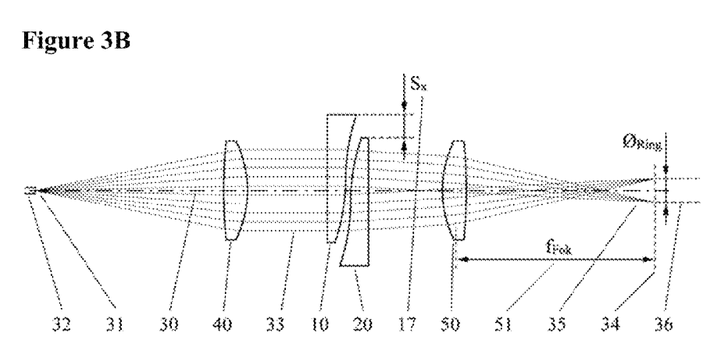
FIG. 3B: Representation of a schematic array of a device according to the invention in laser optics to generate a ring-shaped beam spot in the focal plane of laser optics with a plate pair in a displaced position so that the plate pair has an optical effect comparable to an axicon, and thus a ring-shaped beam spot is generated. The displacement of the plate pair allows adjusting the diameter of the ring.

FIGS. 3A and 3B show how the invention can be used in laser optics. Laser optics can, for example, consist of a collimator 40 and a focusing lens 50 which are conjointly positioned on an optical axis 30. A collimator 40 collimates the beam emitted by a beam source 31; a fibre tip 32 can generate the beam source 31, for example. The focusing lens 50 with the focal length 51 images the collimated beam 33 in the focal plane 34. In this context, the plate pair according to the invention, which is generated by the plate-like elements 10 and 20, can be positioned between the collimator 40 and focusing lens 50 of laser optics. FIG. 3a shows the plate pair in zero position, i.e. the two plate-like elements 10, 20 are not displaced against each other so that the plate pair does not have any optical effect. Thus, the beam spot generated in the focal plane 34 corresponds to the unmodified focus of laser optics.

In contrast, FIG. 3B shows the plate pair in a position displaced by the distance 17 (symbol $S_x$). Thus, the effect of both plates 10, 20 is not compensated, and a modification of the wave front of the beam 33 is the result so that a ring-shaped beam spot 35 with the diameter of the ring 36 (symbol $Ø_{Ring}$) is generated if it is imaged in the focal plane 34. The diameter of the ring 36 of the ring-shaped beam spot 35 is defined by the degree of movement 17, and in this way it can continuously be adjusted and modified.

Figure 4A:
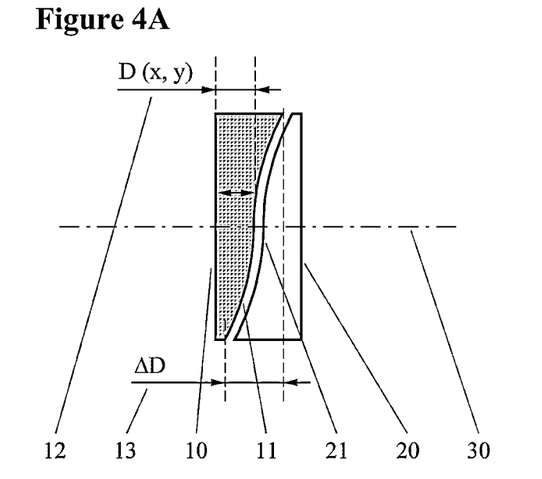
FIG. 4A: Schematic representation of the plate pair in a possible embodiment wherein the variation of the thickness of a single plate is relatively wide.

FIG. 4A shows a possible embodiment of the invention. The free-form surface 11 of the first plate-like element 10 has the effect that the plate provides a varying thickness 12 of the plate depending on the position x, y. The variation of the thickness is characterized by the distance 13 (symbol $\Delta D$) between the minimum and maximum thickness of the plate. The variation of the thickness can be relatively wide if the linear x-term is zeroized in the mathematical equation of the free-form surface 11. This case is indicated in representation 4a wherein the variation of the thickness is extremely exaggerated to illustrate this case.

Figure 4B:
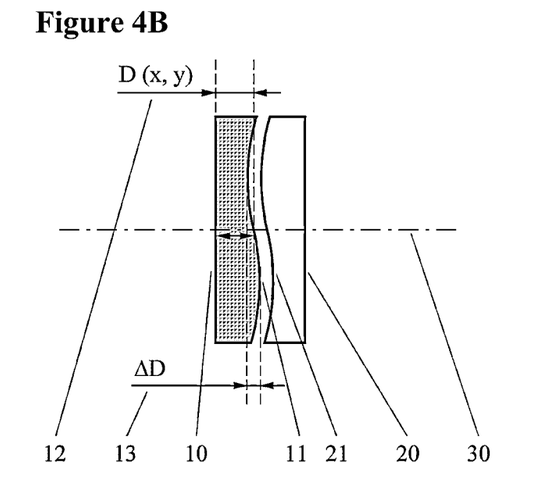
FIG. 4B: Schematic representation of the plate pair in another possible embodiment wherein the free-form surface is favourably inclined if an appropriate linear x-depending term is chosen so that the variation of the thickness of a single plate is much lower.

FIG. 4B shows another embodiment of the invention. In this context, the mathematical equation of the linear x-term is not zeroized to reduce the variation of the thickness 13, but an appropriate term is chosen so that the resulting variation of the thickness 13 is much lower. The linear x-term clearly effects a slight inclination of the free-form surface 11. The linear x-term does not have any optical effect because the free-form surface 21 of the second plate-like element 20 is inclined in the same way. It only helps to minimize the variation of the thickness 13.

Figure 4C:
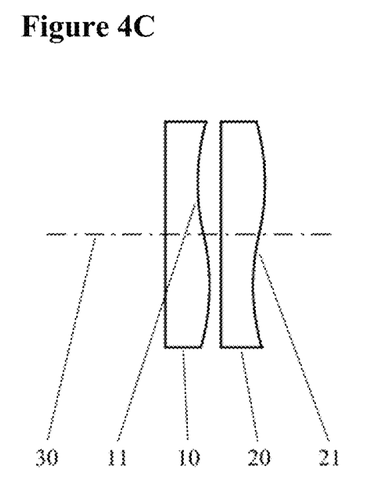
FIG. 4C: Representation of an embodiment of the invention wherein the free-form surfaces of both elements of the plate pair are oriented towards the same direction.
Figure 4D:
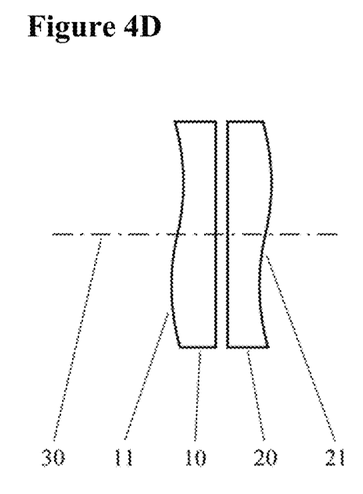
FIG. 4D: Representation of another possible embodiment of the invention wherein the two free-form surfaces of the elements of the plate pair are positioned and oriented outwards so that the optical flats of the plate-like elements are opposite each other.

FIGS. 4C and 4D show other embodiments of the invention. The orientation of the plate-like elements 10, 20 is not limited to the stipulation that the free-form surfaces 11, 21 are opposite each other. It is also possible that the two free-form surfaces 11, 21 are oriented towards the same side, as shown in FIG. 4C, or that not the free-form surfaces of the elements but the optical flats are opposite each other as shown in FIG. 4D.

Figure 5A:
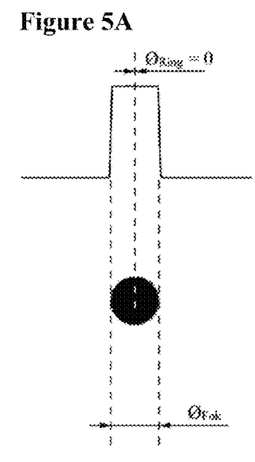
Figure 5B:
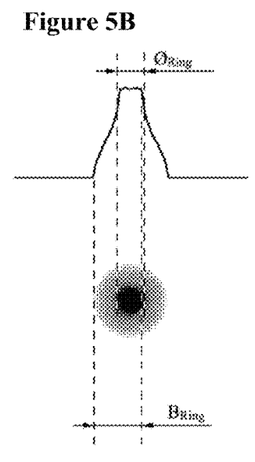
Figure 5C:
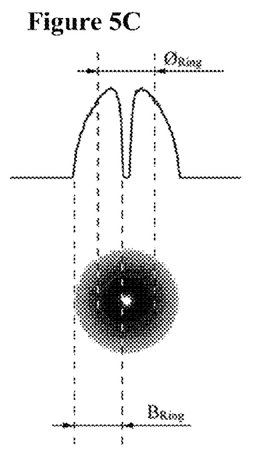
Figure 5D:
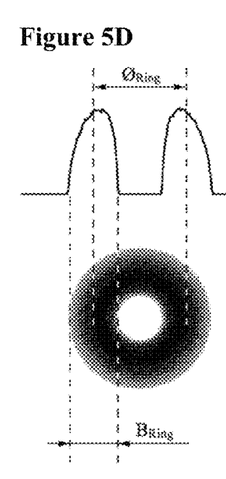
Figure 5E:
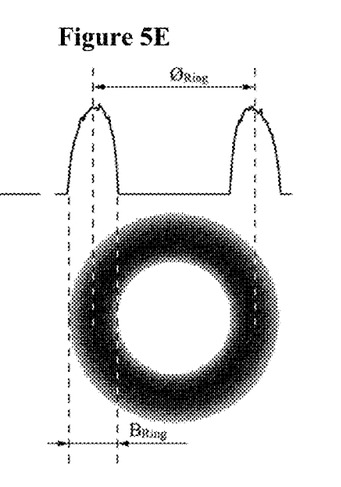

Finally, FIGS. 5A to 5E represent schematic representations of possible beam spot images in the focal plane of laser optics which show an embodiment of the invention wherein a ring-shaped beam spot is generated. The lower part of the figures shows the beam spot in a greyscale picture overviewing the focal plane while the respectively corresponding intensity profile is represented above in section. If the plate pair is in zero position, i.e. the plate-like elements are not displaced against each other ($S_x=0$), the diameter of the ring in the beam spot is also equal to zero. Thus, there is no ring, and the beam spot corresponds to the unmodified beam spot or the focus of laser optics without plate pair. This case is shown in FIG. 5A. However, if the plate-like elements are displaced against each other, the beam spot in the focal plane is ring-shaped. If the displacement 17 is gradually increased, the diameter of the ring of the ring-shaped beam spot also increases, which is shown in FIGS. 5B to 5E. As soon as the diameter of the ring is large enough to reduce the intensity to zero in the centre of the beam spot, it can be seen that the width of the ring always corresponds to the diameter of the unmodified beam spot (i.e. for a plate pair in zero position).

Figure 6A:
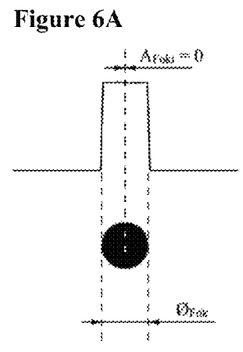
Figure 6B:
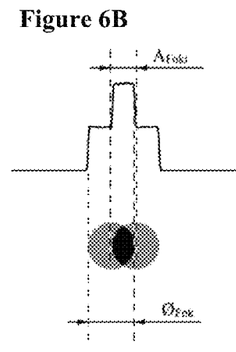
Figure 6C:
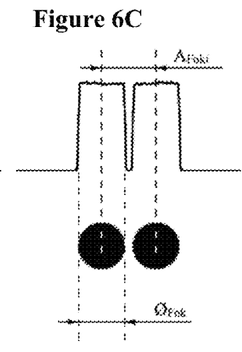
Figure 6D:
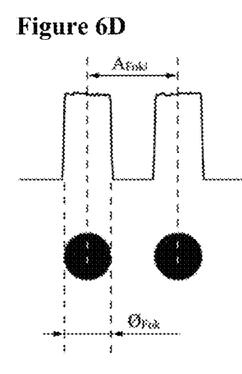
Figure 6E:
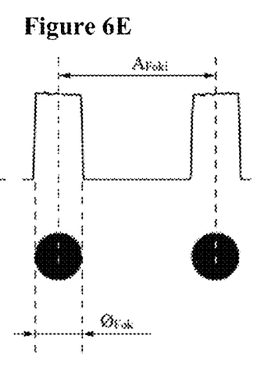

FIGS. 6A to 6E represent schematic representations of beam spot images in the focal plane of laser optics which show another possible embodiment of the invention wherein a double focus with an adjustable distance of both different beam foci is generated. It is possible to generate such a focal shape if the profile shape of the elements is characterized by each section being in the direction of y identical to the centre cross section if y=0. If both elements are not displaced against each other ($S_x=0$), the distance of both different foci in the beam spot is also equal to zero. Thus, there is no double focus. The beam spot corresponds to the unmodified beam spot of laser optics without plate pair. This case is shown in FIG. 6a. However, if the plate-like elements are displaced against each other, the beam spot in the focal plane has the shape of a double focus. If the displacement 17 is gradually increased, the distance of the different beam foci also increases, which is shown in FIGS. 5b to 5e. Thus, it is both possible to define such a short distance that the two different beam foci partly overlap with respect to each other (FIG. 6B) and to define such a long distance that the two different beam foci are completely separated from each other and have a gap of adjustable size between the beam foci (FIGS. 6C to 6E).

A solution shall be provided for the problem to modify and adjust a laser beam in such a way that a beam spot is generated after focusing the beam. The shape of the beam spot has to be continuously adjustable based on the original focal shape, i.e. at least one parameter of the shape of the beam spot has to be variably adjustable, allowing modifying the beam parameter product of the beam without modifying the focal position.

A device consisting of two plate-like optical elements 10, 20, which are positioned in a row at short distance on an optical axis 30 and which are positioned displaceable against each other transversal to the optical axis (14, 24), is suggested to solve the problem. In this context, each of both elements 10, 20 has at least one free-form surface 11, 21, i.e. a surface which is not plane, which cannot be described by a sphere of random curvature and which is not rotation-symmetric so that the thickness of the elements 10, 20 is position dependent. In this context, a position of the plate-like elements 10, 20 called zero position is defined at which the thickness profiles of the plate-like elements are inverse to each other so that the effect of both plates is cancelled by each other in this position. If the plates are displaced against each other, their effect is not cancelled anymore. The beam 33 traverses the two elements 10, 20 consecutively, modifying the wave front of the beam 33. Modifying the wave front corresponds to modifying the optical path length after having traversed the two elements 10, 20. Modifications of the optical path length $\Delta L_{xy}$ result from the following equation:

$$\Delta L_{xy} = (n-1)(D_{1xy} + D_{2xy}) \qquad \text{[Equation 1]}$$

$D_{1xy}$ is the position dependent thickness 12 of the first optical element 10, and $D_{2xy}$ is the position dependent thickness of the second optical element 20; n is the refraction number of both elements. The two plates can be displaced against each other by a distance $S_x$ (17) in x-direction (14, 24)

so that the internal x-coordinates $x_1$, $x_2$ of both plates are transformed into the outward coordinate x according to $x_1=x+S_x/2$ and $x_2=x-S_x/2$.

The thicknesses $D_{1xy}$, $D_{2xy}$ of both elements vary at the position xy where a partial ray of the ray beam 33 accomplishes the two elements because it is possible to displace the two elements 10, 20 against each other in x-direction by a distance $S_x$ (17). Thus, the optical path length of the partial ray also varies. In this way, it is possible to vary the wave front profile of the ray beam 33 continuously. Modifying the wave front directly corresponds to the total sum of the thickness profiles of both plate-like elements 10, 20 dependent on the displacement $S_x$ (17). This type of device designed to modify the wave front profile is not basically new as it is shown in the state of the art. One specific aspect of the invention is that it is possible to define the thickness profile of the elements or the profile of the free-form surfaces 11, 21 in such a way that the underlying problem can be solved.

The problem is solved by total sum of the thickness profiles $\Sigma D_{x,0}$ of the plate pair, i.e. the sum of the thickness profiles of both optical elements 10, 20 in the respective displaced position, considering a centre cross section along the displacement axis, i.e. in x-direction if y=0, describing a profile which corresponds to an isosceles triangle. In this context, the inclination angle of both sides of the triangular profile can be adjusted by displacement 17 the two plates 10, 20 against each other. The further the plates are displaced against each other, the higher is the inclination angle of the sides of the triangular profile. The total sum of the thickness profiles considering a centre cross section of the plate pair can be described in mathematical terms by the following equation:

$$\Sigma D_{x,0} = d - |x|\tan(\alpha) \quad \text{[Equation 2]}$$

The inclination angle $\alpha$ of the sides of the triangular profile is defined by the inclination $\tan(\alpha)$. The inclination angle can be adjusted by the displacement $S_x$ of both plates against each other. Parameter d describes the sum of the thicknesses of both elements on the optical axis.

Furthermore, the thickness profiles of the different elements 10, 20 considering a centre cross section along the displacement axis, i.e. considering a section along the x-axis crossing the optical axis if y=0 provide a constant curvature, which is positive in one half of the section and negative in the other half; the absolute value of the curvature is the same on both sides. This condition can be described by the following equations because the curvature is defined by the second derivative with respect to position in mathematical terms:

$$(\partial^2/\partial x^2)D_{x,0} = a \text{ if } x>0 \quad \text{[Equation 3a]}$$

$$(\partial^2/\partial x^2)D_{x,0} = -a \text{ if } x<0 \quad \text{[Equation 3b]}$$

Curvature a is an absolute term of which the dimension is defined by the type of displacement $S_x$ and the type of inclination angle $\alpha$ generated; the correlation is described by the following equation:

$$\tan(\alpha) = a\, S_x \quad \text{[Equation 4]}$$

It is shown in equation 4 that a higher degree of curvature a has to be chosen if the same inclination angle $\alpha$ is to be achieved by a lower degree of movement $S_x$.

If the differential equations are integrated into equation 3a and 3b, the following equation is a possible solution for the thickness profile considering a centre cross section:

$$D_{x,0} = (a/2)x|x| \quad \text{[Equation 5]}$$

It has to be taken into consideration that the term on the right side of equation 5 is not identical to a quadratic term according to $(a/2) x^2$ because in the latter the constant curvature does not change the algebraic sign if x=0. Thus, the centre cross section of the optical elements according to the invention corresponds to a parabola function wherein one of the parabola branches is mirrored in the algebraic sign at the extreme position. Taking into consideration the qualitative progression, this profile is certainly similar to a function of third degree (e.g. $f=x^3$), which is used in the device presented in U.S. Pat. No. 3,305,294 as a basic characteristic. Thus, the sections of the elements shown in the figures in this context (cf. FIGS. 1, 2, 4 and 5 of U.S. Pat. No. 3,305,294) are similar to the sections presented within the present document (FIGS. 4a to 4d). However, a function of third degree as section like in U.S. Pat. No. 3,305,294 would not solve the present problem because variable refractive power would result from the displacement of the elements against each other, resulting in a simple displacement of the axial focal position. The reason for this result is that the curvature (i.e. the second derivative with respect to position) is not constant for a function of third degree, but it increases linearly with the position (x). Thus, a decisive requirement of U.S. Pat. No. 3,305,294 is that the third derivative with respect to position has to be constant (cf. the equation in column 2 line 64 of U.S. Pat. No. 3,305,294) and not the second derivative as in the present invention.

The solution of the problem cannot be found in DE 199 61 918 either because in this context cylindrical lenses are required as optical elements to solve the problem, i.e. the lateral movement of the focus of a partial ray. The latter provide a constant curvature, but without changing the algebraic sign in one half of the element. However, it is necessary to change the algebraic sign to solve the present problem. Changing the algebraic sign is the only way to deviate a portion of the ray beam in different directions, allowing to be imaged in laterally separated points after focusing, wherein the plane of the focal position along the optical axis, i.e. in z-direction, is kept. Neither this document nor any other document from the state of the art comprises any indication regarding how to adjust the curvature of the optical elements as defined by the present invention. This results also from the fact that no solution according to the invention disclosed in the present application has been presented within the last 14 years.

The description of the total free-form surface 11 or 21 or of the total thickness profile 12 going beyond the centre cross section depends in the end on the beam shape required in the focal plane 34 as well on the parameter chosen by displacement 17 of the elements 10, 20 against each other. The wavefront of the beam 33 has to be modified in a similar way as for traversing an axicon to generate, for example, a ring-shaped beam spot 35 in the focus. Thus, the sum $\Sigma D_{xy}$ of the position dependent thicknesses of both elements 10, 20 together has to correspond to the thickness profile of an axicon, i.e. a cone surface. It can be described in mathematical terms by the following equation:

$$\Sigma D_{xy} = d - (x^2+y^2)^{1/2}\tan(\alpha) \quad \text{[Equation 6]}$$

The total sum of the thickness profiles considering a center cross section according to equation 2 required for all embodiments of the invention results from equation 6 for the centre cross section, i.e. if y=0.

Equation 6 is to be applied to any displacement 17 of the elements 10, 20 to each other in order to generate a ring-shaped beam spot 35 in the focal plane 34. It is to be applied in such a way that the resulting cone angle $\alpha$ of the cone surface of the equivalent axicon, which is defined by the sum of the thickness profiles of both plates, can be adjusted by displacing the plates $S_x$ (17). The different elements 10, 20 have to provide a complex thickness profile to meet these requirements wherein the position dependent thickness of one element is defined by the following equation:

$$D_{xy}=D_0+(a/2)\{x(x^2+y^2)^{1/2}+y^2[\ln(x+(x^2+y^2)^{1/2})-\ln|y|]\}+bx \quad \text{[Equation 7]}$$

x is the coordinate in the direction of the displacement axis (14, 24), y is the coordinate vertically to the displacement axis, $D_0$ is the thickness of the elements on the optical axis if x=y=0, and a and b are two constant parameters. This equation indicates the best possible approximation to the ideal thickness profile in a complete mathematical equation; other mathematical equations or numeric representations of the profile shape, which only differ slightly from the indicated equation, are within the scope of the invention provided that the sum of the thickness profile of both elements together only differs marginally from the thickness profile of a cone surface.

Parameter a in equation 7 is the proportionality constant between the movement $S_x$ of the plate pair and the inclination of the cone surface tan(α) according to equation 4.

The ring-shaped beam spots 35 with an adjustable diameter of the ring 36 generated by means of the present illustrative embodiment of the invention in the focal plane 34 of a focusing lens 50 are shown in the schematic representation in FIGS. 5A to 5E.

In another illustrative embodiment of the invention the free-form surfaces of the plate pair are designed in such a way that the sum of the position dependent thicknesses of both elements 10, 20 corresponds to a pitched roof surface with an isosceles triangular section. The roof-shaped total sum of the thickness profiles of the plate pair can be described in mathematical terms by the following equation:

$$\Sigma D_{xy}=d-|x|\tan(\alpha) \quad \text{[Equation 8]}$$

The right side of equation 8 is identical to the corresponding term in equation 2 for the centre cross section of the total sum of the thickness profiles. It does not only apply to the centre cross section but also to the total surface, i.e. the whole co-domain of the coordinate y.

This illustrative embodiment of the invention does not allow generating a ring-shaped beam spot in the focal plane because there is not any rotation symmetry, but a double beam spot is generated which is similar to deviating the beam 33 by means of a double wedge or a roof edge prism wherein which the distance of the different beam foci to each other can be adjusted by moving $S_x$ the plate pair. In this context, the different plate-like elements provide a position dependent thickness according to the following equation:

$$D_{xy}=(a/2)x|x|+bx \quad \text{[Equation 9]}$$

The beam spots in the focal plane 34 of a focusing lens 50, which can be generated in an embodiment of the invention, are shown in the schematic representation in FIGS. 6A to 6E.

Equations 7 and 9 regarding the position dependent thickness of the plate-like element comprise each an additive linear term (+b x). In principle, constant b of this term is arbitrary because the linear term does not have any impact in the total sum of the thickness profiles. This arbitrary option can be used to optimize the total variation AD (13) of the thickness of a single element. In terms of manufacturing, for example, it can make sense to keep the total variation of the thickness of a single element at a low level. This aim can be achieved by choosing an appropriate constant b. FIG. 4A shows an example of a thickness profile without linear term (i.e. b=0) whereas FIG. 4B shows an example wherein the variation of the thickness AD is considerably lower due to choosing an appropriate constant b.

The orientation of the plate-like elements 10, 20 regarding front and back is arbitrary. Both the free-form surfaces 11, 21 and the optical flats can face each other; the two free-form surfaces can also be directed to the same direction. However, it is necessary that the plates are inverse to each other with respect to the displacement direction, i.e. the x-axis. FIGS. 4A to 4D show different possibilities of adjustment.

The two plate-like elements 10, 20 of the plate pair can be designed identically; particularly the free-form surfaces 11, 21 of both plates can be shaped identically. Thus, the two plates are adjusted in such a way that the second plate 20 is positioned rotated by 180° along the y-axis opposite the first plate 10. FIG. 4A, 4B or 4D show the resulting arrangement.

Two identical plate-like elements can also be adjusted in such a way that the second plate 20 is positioned rotated by 180° along the z-axis opposite the first plate 10, i.e. the optical axis. FIG. 4C shows this type of arrangement.

Having a closer look at the wave front modification generated by the device, it becomes obvious that slight deviations from the idealized mathematically formulated wave front modification arise in the centre of the beam 33, i.e. in the close paraxial range around the optical axis 30. According to equation 1 the wave front modification is proportional to the total sum of the thickness profiles of both elements 10, 20. The result of a displacement 17 of the plates against each other is a slight honing of the total sum of the thickness profiles in the centre, i.e. if a ring-shaped beam is shaped, the required cone surface of the sum profile is not pointed in the centre but slightly flattened. This deviation is practically not relevant because it only concerns a small part of the beam, but it results in the fact that a very low portion of the output of the beam is distributed in the range inside of the ring in the ring-shaped beam spot. The further the plates are displaced against each other, the more this effect arises. It is advantageous to limit the maximum moving range of the plate pair, for example to a limit of maximal 10% of the lateral dimensions of the plates, to keep this effect at a low level. However, only a sufficiently high curvature of the free-form surfaces 11, 21 has to be chosen using parameter a to generate the requested maximum diameter of the ring.

It is also possible to limit the maximum moving range of the plate pair depending on the diameter of the expanded laser beam 33, for example to a maximum limit of maximal 20% of the diameter of the beam, which the laser beam provides in the range of the plate pair, to keep the effects of wave front deviations from the ideal shape at a low level.

A focusing lens 50 can image the laser beam 33 with the wave front, which can be adjusted and modified by the plate pair. If the laser beam 33 collimates in front of the plate pair, a beam spot 35 is generated in the focal plane 34 of the focusing lens 50, i.e. approximately in the distance of the focal length 51 of the lens, wherein it is possible to variably adjust the parameter 36 of the beam spot.

In an embodiment allowing to generate a ring-shaped beam spot 35, the diameter $\emptyset_{Ring}$ (36) of the ring in the focal plane 34 of the focusing lens 50 with the focal length $f_{Fok}$ (51) is defined by the following equation:

$$\emptyset_{Ring}=2a(n-1)f_{Fok}S_x \quad \text{[Equation 10]}$$

a is equal to the curvature of the plate-like elements considering a centre cross section or equal to parameter a in equation 7; n is the refraction number of the plate-like elements 10, 20. Thus, the diameter 36 of the ring-shaped beam spot 35 in the focal plane 34 is proportional to the movement $S_x$ (17) of the plate-like elements against each other. If the movement 17 is equal to zero, the diameter of the ring 36 is also equal to zero; in this case the beam spot corresponds to the unmodified focus of the laser beam as shown in FIG. 5A.

In an embodiment allowing to generate a double focus the distance $A_{Foki}$ of both different beam foci in the focal plane 34 of the focusing lens 50 with the focal length $f_{Fok}$ (51) is described by the same term as in equation 10:

$$A_{Foki}=2a(n-1)f_{Fok}S_x \qquad \text{[Equation 11]}$$

a is equal to the curvature of the plate-like elements considering a centre cross section or equal to parameter a in equation 9; n is the refraction number of the plate-like elements. Thus, the distance of the different beam foci in the focal plane 34 is proportional to the movement $S_x$ (17) of the plate-like elements against each other. If the movement is equal to zero, the distance is also equal to zero (see FIG. 6A).

A collimation lens 40 in front of the plate pair can be provided to collimate the laser beam. The collimation lens 40 collimates the beam, i.e. it generates an approximately parallel ray beam 33 from a divergent laser beam, which can be emitted, for example, from a fibre tip 32.

However, the invention is not limited to the requirement that the plate pair 10, 20 is positioned in a collimated beam 33. The plate pair can also be positioned in the divergent or convergent region of the beam, the beam merely has to be expanded to such an extent that the beam covers a sufficient region of the plate pair. Thus, it is also possible to combine the collimation lens 40 and the focusing lens 50 in a single imaging laser optics, wherein the plate pair is positioned in front of or behind the laser optics.

The collimation lens 40, the focusing lens 50 or laser optics can be designed as a lens with an adjustable focal length, i.e. a zoom lens, allowing to modify the reproduction scale so that it is also possible to modify the focal diameter or the width of the ring, which corresponds to the focal diameter, independently from the diameter of the ring.

In principle, any type of optical glass can be used as material for the optical elements 10, 20.

If the device is used in combination with high-intensity laser beaming, it is recommended to use optical glasses and crystals with a particularly low absorption as material for the plate pair 10, 20. Materials with a particularly low absorption are for example Quartz glass, fused silica, sapphire or zinc sulphide.

It is advantageous to use zinc sulphide as material for the plate-like optical elements 10, 20 because the material can directly be processed by means of diamond lathes, allowing to generating easily complex surface shapes.

The invention is designed to be applied in different laser joining processes like for example for cutting components (cutting, drilling), for joining components (welding, brazing or soldering) or for filling up materials on components (coating). The device is designed to be used in laser joining processes to improve the process quality, for example for cutting cleaner and burr-free cutting edges or for enhancing the bonding cross section if two components are welded or for optimizing the energy input by using optimally adjusted beam shapes. On the one hand, the device allows adjusting the respective optimal beam shape for processing different components without having to convert or change the device. On the other hand, it allows adjusting the beam shape during the processing process, for example if the material thickness of components changes within a joining geometry. Furthermore, it is possible to use the beam shape as a variable in a closed loop of a laser joining process to respond to variation of the joining quality in real time.

LIST OF REFERENCE NUMERALS

10 First plate-like element
11 Free-form surface of the first element
12 Thickness of the plate-like element
13 Variation of the thickness of the plate-like element
14 Moving direction of the first element
17 Displacement between first and second element
20 Second plate-like element
21 Free-form surface of the second element
24 Moving direction of the second element
30 Optical axis
31 Beam source, beam exit position or beam waist
32 Fibre tip
33 Collimated beam
34 Focal plane of the beam
35 Ring-shaped beam focus
36 Diameter of the ring of the ring-shaped beam focus
37 Width of the ring of the ring-shaped beam focus
40 Collimation lens
40 Focusing lens
50 Focal length of the focusing lens
51 Axicon (cone lens)
60 Angle of the cone surface of the axicon

The invention claimed is:

1. An optical device comprising at least two plate-like optical elements, which have a position dependent thickness and which are positioned in a row at short distance in the optical path of a position limited ray beam, wherein both plate-like elements are arranged displaceable along an axis transversal to the propagation direction of the ray beam, wherein x is the coordinate in the direction along the displacement axis, y is the coordinate vertically to the displacement axis, and z is the coordinate in the direction along the optical axis, and wherein a position of the plate-like elements called zero position is defined at which the thickness profiles are inverse to each other, wherein:
   a. the total sum of the thickness profiles of both optical elements together describes in a centre cross section along the x coordinate with y=0 a profile, which corresponds to an isosceles triangle, and wherein the inclination of the laterals of said isosceles triangle in said centre cross section is adjustable by displacement of both optical elements against each other in direction of the x coordinate, and
   b. both plate-like elements provide a thickness profile that shows a constant absolute value of the second derivative in a centre cross section along the x coordinate with y=0, which is constantly positive in one half of the centre cross section and constantly negative in the other half, and the absolute value of the curvature is the same on both sides.

2. The device according to claim 1, wherein the sum of the position dependent thicknesses of both optical elements describes a cone surface.

3. The device according to claim 2, wherein the cone angle of the cone surface can be adjusted by displacement of both optical elements against each other.

4. The device according to claim 1, wherein the position dependent thickness $D_{xy}$ of a single plate-like element is defined for both elements by the following equation:

$$D_{xy}=D_0+(a/2)\{x(x^2+y^2)^{1/2}+y^2[\ln(x+(x^2+y^2)^{1/2}-\ln|y|]\}bx$$

wherein x is the coordinate in the direction of the displacement axis, y is the coordinate vertically to the displacement axis, $D_0$ is the thickness of the element on the optical axis with x=y=0, and a and b are two constant parameters.

5. The device according to claim 1, wherein the sum of the position dependent thicknesses of both optical elements together describes an isosceles triangular cross section.

6. The device according to claim 5, wherein the inclination angle of the lateral surfaces of the pitched roof surface is adjustable by displacement of both optical elements against each other.

7. The device according to claim 1, wherein position dependent thickness $D_{xy}$ of a single plate-like element is defined for both elements by the following equation:

$$D_{xy}=D_0+(a/2)\times|x|+bx$$

wherein x is the coordinate in the direction of the displacement axis, $D_0$ is the thickness of the element on the optical axis with x=y=0, and a and b are two constant parameters.

8. The device according to claim 1, wherein the thickness profile of both plate-like elements is identical and that one element is arranged rotated by 180° along the y-axis with respect to the other element, and the y-axis is the axis which is positioned both vertically to the displacement axis of the elements and vertically to the optical axis.

9. The device according to claim 1, wherein the thickness profile of both plate-like elements is identical and one element is rotated by 180° along the z-axis with respect to the other element, and the z-axis corresponds to the optical axis.

10. The device according to claim 1, wherein a focusing lens is arranged behind both plate-like elements in the beam direction.

11. The device according to claim 1, wherein a collimation lens is arranged in front of both plate-like elements in the beam direction.

12. The device according to claim 1, wherein the maximum displacement of both plate-like elements against each other corresponds to maximal 10% of the lateral dimensions of the plates.

13. The device according to claim 1, wherein the maximum displacement of both plate-like elements against each other corresponds to maximal 20% of the diameter of the beam.

14. The device according to claim 1, wherein the plate-like elements are made of zinc sulphide.

15. A use of a device according to claim 1, for modifying at least one dimension parameter of the beam spot in the focal plane without modifying the focal position itself.

16. A use of a device according to claim 1, for generating a wave front deformation with the beam parameter product of the beam being continuously adjustable and magnifiable beginning with its original value.

17. A use of a device according to claim 1, in an assembly for joining or cutting components as well as to fill up materials on workpieces.

* * * * *